United States Patent
Fitch et al.

(10) Patent No.: US 10,730,004 B2
(45) Date of Patent: Aug. 4, 2020

(54) RECOVERY OF OXYGEN USED IN OZONE PRODUCTION

(71) Applicant: Messer Industries USA, Inc., Bridgewater, NJ (US)

(72) Inventors: Frank R. Fitch, Bedminster, NJ (US); Francisco Huertas, North Brunswick, NJ (US)

(73) Assignee: Messer Industries USA, Inc., Wilmington, DE (US)

( * ) Notice: Subject to any disclaimer, the term of this patent is extended or adjusted under 35 U.S.C. 154(b) by 182 days.

(21) Appl. No.: 16/054,127

(22) Filed: Aug. 3, 2018

(65) Prior Publication Data

US 2020/0038802 A1    Feb. 6, 2020

(51) Int. Cl.
*B01D 53/04* (2006.01)
*C01B 13/10* (2006.01)

(52) U.S. Cl.
CPC ..... *B01D 53/0446* (2013.01); *B01D 53/0423* (2013.01); *B01D 53/0454* (2013.01); *B01D 2253/106* (2013.01); *B01D 2253/108* (2013.01); *B01D 2256/14* (2013.01); *B01D 2257/104* (2013.01); *B01D 2259/404* (2013.01); *B01D 2259/40086* (2013.01)

(58) Field of Classification Search
CPC ............ B01D 53/0423; B01D 53/0446; B01D 53/0454; B01D 53/047; B01D 2253/106; B01D 2253/108; B01D 2256/14; B01D 2257/104; B01D 2259/40045; B01D 2259/40052; B01D 2259/40086; B01D 2259/404; C01B 10/13

USPC ................. 95/96, 97, 98, 138, 148; 423/219
See application file for complete search history.

(56) References Cited

U.S. PATENT DOCUMENTS

| | | | |
|---|---|---|---|
| 2,872,397 A | 2/1959 | Kiffer | |
| 3,505,213 A | 4/1970 | Anthony et al. | |
| 4,136,027 A * | 1/1979 | Sakamoto | C02F 1/78 204/176 |
| 4,786,489 A | 11/1988 | Grenier | |
| 4,940,808 A | 7/1990 | Schutz et al. | |
| 5,520,887 A | 5/1996 | Shimizu | |
| 5,730,783 A | 3/1998 | Sanui | |
| 6,030,598 A | 2/2000 | Topham | |
| 6,190,436 B1 * | 2/2001 | Ji | B01D 63/02 95/45 |
| 6,193,852 B1 | 2/2001 | Caracciolo et al. | |
| 6,197,091 B1 | 3/2001 | Ji et al. | |
| 6,344,130 B1 | 2/2002 | Koike | |
| 6,916,359 B2 | 7/2005 | Jain | |
| 7,766,995 B2 | 8/2010 | Suchak et al. | |
| 8,337,674 B2 | 12/2012 | Weist | |
| 8,460,435 B2 | 6/2013 | Tabata | |
| 2002/0038801 A1 * | 4/2002 | Laken | B29C 66/91221 219/544 |
| 2017/0173514 A1 | 6/2017 | Fitch | |

(Continued)

*Primary Examiner* — Frank M Lawrence, Jr.
(74) *Attorney, Agent, or Firm* — Joshua L. Cohen (57) ABSTRACT

A method of continuous ozone production using a system of four absorbent beds to separate an ozone and oxygen gas mixture generated in an ozone generator. The beds are operated according to an offset sequence of cycles. Oxygen passing through the beds is at least partially recycled for use in further ozone generation. The concentration of oxygen in the ozone product can be reduced using the system to make it suitable for use in fine chemical applications.

23 Claims, 9 Drawing Sheets

(56) References Cited

U.S. PATENT DOCUMENTS

2018/0065079 A1 3/2018 Fitch et al.
2019/0111379 A1* 4/2019 Nakamura ......... B01D 53/0454

* cited by examiner

FIG. 1
(PRIOR ART)

| S1 | S2 | S3 | S4 | S5 |
|---|---|---|---|---|
| FEED & RECYCLE STEP | BED PURGE & PRODUCTION STEP | EXTERNAL PURGE & PRODUCTION STEP | SEND PURGE & VENT STEP | SEND PURGE STEP |
| OXYGEN TO RECYCLE CIRCUIT ⇑ | RECEIVE PURGE FROM OTHER BED TO RECYCLE CIRCUIT ⇓ | RECEIVE PURGE FROM AIR OR NITROGEN RICH GAS ⇓ | SEND PURGE TO OTHER BED AND PARTIAL VENT ⇑ | SEND PURGE TO OTHER BED ⇑ |
| X | X | X | X | X |
| ⇑ FEED GAS FROM OZONE GENERATOR | ⇓ PRODUCT | ⇓ PRODUCT | ⇑ FEED GAS FROM OZONE GENERATOR | ⇑ FEED GAS FROM OZONE GENERATOR |
| OPEN: X-4 & X-1 | X-2 & X-5 | X-3 & X-5 | X-4, X-2 & 6 | X-4 & X-2 |

RECOVERY OF OXYGEN USED IN OZONE PRODUCTION

BACKGROUND OF THE INVENTION

Ozone is utilized in a number of industrial processes, including drinking water and waste water treatment and disinfection, pulp bleaching, ozonolysis reactions in fine chemical production, and flue-gas denitrification.

Ozone is an unstable compound that decomposes to oxygen under ambient conditions and therefore it is not feasible to manufacture, transport or store in the manner used for many chemicals supplied through normal commerce. Rather, ozone must be produced at the point-of-use and at the time it is needed. Since ozone is a toxic material, it is generated only where and when it is required, in order to limit the possibility and potential impact of incidents.

Ozone is typically generated from oxygen utilizing a corona discharge. Oxygen is often used as the oxygen source for ozone generation and results in ozone concentrations of 10 to 15% by weight (balance oxygen) being produced. Air may also be used as the source of oxygen and produces ozone concentrations of 1.5 to 3% (balance air). For moderate to large ozone requirements, the total capital plus operating costs are typically less when oxygen is used as the oxygen source.

Ozone is often utilized at 10 wt % ozone with the balance being largely oxygen. It has been recognized that the re-use of the oxygen from the ozone/oxygen mixture generated by oxygen-based ozone generators can substantially improve the economics for ozone generation. Therefore, many schemes have been proposed for the separation of ozone from the ozone/oxygen output stream of the ozone generator, that allow oxygen to be recycled back to the ozone generator. In most of these schemes the separated ozone is displaced into the final ozone-utilizing process by means of an inert gas stream. For example, Balcar et al. Ozone Chemistry and Technology, pp 53 to 59, Advances in Chemistry; American Chemical Society, Washington, D.C. 1959 proposed the cryogenic liquefaction of the ozone, with re-evaporation of the condensed ozone into a carrier gas. Kiffer et al. (U.S. Pat. No. 2,872,397) and Cook et al., Ozone Chemistry and Technology, pp. 44 to 52, Advances in Chemistry; American Chemical Society, Washington, D.C. 1959 propose the use of a silica gel adsorbent to selectively adsorb ozone from the ozone/oxygen mixture after cooling of the stream, and with subsequent desorption of the ozone to the customer process by means of an inert gas, such as air, nitrogen, argon, etc., or by application of a vacuum.

In addition, the use of selective adsorbents for separation of the oxygen and ozone in the production stream have been proposed. This separation allows recycle of the unused oxygen to the ozone generator and an ozone product stream. For example, U.S. Pat. No. 4,786,489 targets reducing the costs for large scale ozone and teaches the use of a low temperature (−80 to −90° C.) ozone/oxygen separation unit that is purged with an impure nitrogen carrier gas stream containing oxygen and/or air to give the ozone product. U.S. Pat. No. 5,520,887 is directed at reducing the costs of ozone generation for pulp bleaching and teaches the use of a PSA oxygen generator to provide an enriched oxygen feed to an ozone generator, an oxygen ozone PSA to adsorb ozone and at the same time recycle oxygen to the ozone generator. The nitrogen rich waste gas from the $O_2$ PSA is used to purge adsorbed ozone from the ozone oxygen PSA to the ozone consuming process. U.S. Pat. No. 6,030,598 describes the production of an ozone containing gas stream by subjecting oxygen to an electric discharge, adsorbing the ozone thus generated onto a solid adsorbent (such as zeolite) and recycling the oxygen containing stream leaving the adsorbent to the ozonising process. The oxygen adsorbed on the adsorbent is periodically desorbed by co-currently passing a purge gas over the adsorbent, with the desorbed oxygen recycled to the ozonizer. Ozone is desorbed from the adsorbent by a counter-current flow of purge gas and can then be used in the process needing ozone. A 3-bed (or multiple thereof) process and cycle is described that allows ozone and recycled oxygen to be produced continuously, but still requires each bed to experience a non-productive hold step within a full cycle. U.S. Pat. No. 6,197,091 describes the use of an ozone/oxygen membrane separation system in which ozone permeates through the membrane and is carried by a carrier gas, such as nitrogen, argon or $CO_2$ into the ozone utilizing application, while the oxygen enriched stream is recycled to the ozone generator.

U.S. Pat. No. 6,916,359 describes a method of providing ozone at a pressure above atmospheric pressure using an ozone generator and an oxygen ozone PSA system. The unadsorbed oxygen from the PSA is recycled back to the ozone generator and the ozone product is carried to the ozone application by an inert gas stream at a pressure such that no further compression is needed. The carrier gas can be nitrogen, but is preferentially compressed air used also to feed a PSA oxygen generator that can be used as the oxygen source. U.S. Pat. No. 7,766,995 is targeted at reducing the cost of ozone utilized in the removal and capture of NOx from industrial flue-gas and other process streams. An oxygen ozone separation means allows recycle of oxygen back to the ozone generator and the use of clean dry air to carry the ozone into the industrial process. Optimum ozone production costs are achieved by recycling oxygen to the ozone generator, using the cheapest possible carrier gas to carry the ozone to the point of use, and reducing the power utilization in the ozone generator by operating the generator at lower ozone concentrations than normal (e.g., 6%).

Clearly, there have been many attempts to develop a process that reduces the cost of ozone generation from oxygen by recovering and recycling the un-utilized oxygen stream to the ozone generation, but these attempts have limited commercial application.

A more recent improvement belonging to the same applicant as the current invention was described in U.S. patent application Ser. No. 15/377,021 (filed 13 Dec. 2016). This application describes a method of continuous production of ozone and the recovery of oxygen in a purge cycle adsorption process. This method uses four adsorbent beds that operate is a sequential cycle including the following overlapping cycle steps.

Step a) An oxygen and ozone mixture from an ozone generator is fed to a first bed, where the ozone is adsorbed and the non-adsorbed oxygen passes through the first bed and is recycled to the ozone generator.

Step b) Rinse gas is provided to the first bed in a counter current direction to the flow direction of step a) to desorb ozone from the first bed and deliver the ozone to a customer process. The rinse gas is provided from a third bed (see Step d)).

Step c) A nitrogen-rich purge gas is fed to the first bed, again in the counter current direction to desorb any remaining ozone from the first bed and deliver the ozone to the customer process.

Step d) An oxygen and ozone mixture from the ozone generator is again fed to the first bed in the same flow direction as in step a) and ozone is adsorbed. In this step, the non-adsorbed oxygen acts as a rinse gas to displace any nitrogen-rich purge gas remaining in the first bed and this is then fed to the third bed that is now operating according to step b). This step prepares the first bed to repeat step a) and to restart the cycle for beds 1 and 3.

Step e) An oxygen and ozone mixture from the ozone generator is fed to a second bed, where the ozone is adsorbed and the non-adsorbed oxygen passes through the second bed and is recycled to the ozone generator.

Step f) Rinse gas Is provided to the second bed in a counter current direction to the flow direction of step e) to desorb ozone from the second bed and deliver the ozone to a customer process. The rinse gas is provided from a fourth bed (see Step h)).

Step g) A nitrogen-rich purge gas is fed to the second bed, again in the counter current direction to desorb any remaining ozone from the second bed and deliver the ozone to the customer process.

Step h) An oxygen and ozone mixture from the ozone generator is again fed to the second bed in the same flow direction as in step e) and ozone is adsorbed. In this step, the non-adsorbed oxygen acts as a rinse gas to displace any nitrogen-rich purge gas remaining in the second bed and this is then fed to the fourth bed that is now operating according to step f). This step prepares the second bed to repeat step e) and to restart the cycle for beds 2 and 4.

The cycles for the four adsorption beds operate such that steps e) to h) are offset in time with respect to steps a) to d). The beginning of steps a) and c) overlap with the end of steps e) and g) and the end of steps a) and c) overlap with the beginning of steps e) and g). A portion of the rinse gas may be vented to the atmosphere at the start of steps d) and h). Make-up oxygen is added and mixed with the recycled oxygen before being fed to the ozone generator. The mixture of recycled oxygen and make-up oxygen may be fed through a blower to increase pressure before being fed to the ozone generator. Any ozone that is present in the recycled oxygen is removed by passing the mixture of recycled oxygen and make-up oxygen through an inline ozone destruct unit prior to being fed to the blower. The cycle described can be considered a concentration swing adsorption cycle. The duration of steps a) and c) and e) and g) are equal ranging from 5 to 500 seconds; preferably ranging from 50 to 300 seconds, and more preferably ranging from 60 to 180 seconds. The duration of steps b) and d) and f) and h) are equal ranging from 5 to 90% of the length of step a), preferably ranging from 30 to 80% of step a).

Figure 1:
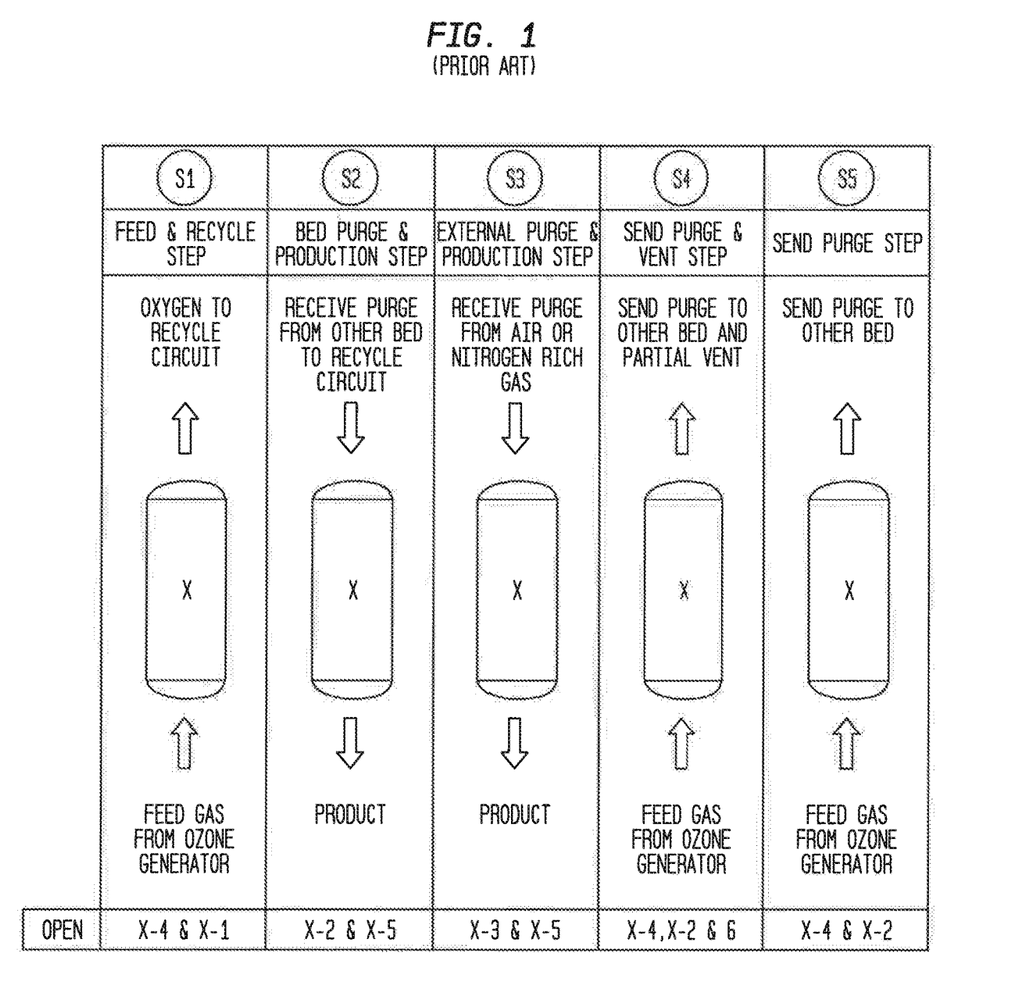
FIG. 1 is a prior art schematic of a four bed process to produce ozone with recovery and recycle of oxygen used in the process.

This sequenced cycle of operation can be further described with reference to prior art FIGS. 1 and 2. FIG. 1 is a schematic of the four bed process used to recover oxygen from an ozone and oxygen gas mixture as described above and FIG. 2 is a schematic of the cycle steps for the four bed oxygen recovery process.

As shown in FIG. 1, make up oxygen is supplied through line 20 and is mixed with recycled oxygen from the adsorbent beds through line 40. The combined oxygen stream is fed through blower 9 to an ozone generator 7. Ozone is produced in the ozone generator at ozone concentrations of 1 to 30%, preferably 5 to 15%, more preferably 8 to 10% by volume (balance oxygen). The ozone and oxygen mixture is fed through line 24 to a manifold 30 for supply of the oxygen/ozone mixture to the bottom of the adsorbent beds. Ozone is adsorbed within the selected adsorbent bed or beds. Line 40 collects the oxygen that passes un-adsorbed out the tops of the selected beds and recycles this stream to be mixed with the make-up oxygen as noted above. Line 50 is a supply line for nitrogen rich purge gas to by supplied to the tops of the beds and that is used to desorb the ozone from such beds. Line 60 collects the ozone product from the bottom of the beds and delivers the ozone product to the customer process. A manifold 70 allows oxygen rich gas to pass from the top of one selected bed to the top of another selected bed in order to remove residual nitrogen from the other selected bed. Alternatively, contaminants or excess inert gases may be vented from manifold 70 through valve 6, preferably passing through an inline ozone destruct unit prior to being vented.

To explain the cyclical operation and valve sequences, an X may be used to represent an adsorbent bed, e.g. any of absorbent beds A, B, C or D shown in FIG. 1. Similarly, a valve number preceded by X is to be interpreted as representing that valve number for any one of the beds A, B, C or D. Each Bed X (X=A, B, C or D) has 2 valves controlling gas flows at the bottom (X4 and X5) and 3 valves at the top (X1, X2 and X3). For a given bed, X, only one valve at the top and one valve at the bottom is open at any one time. Valve X4 connects the bottom of bed X to the oxygen/ozone manifold 30, and valve X1 connects the top of bed X to the recycle oxygen line 40. Valve X3 connects the top of bed X to the nitrogen rich purge gas stream supply line 50 and valve X5 connects the bottom of bed X to the ozone product line 60 to be sent to the customer process. Valve X2 connects the top of bed X to the manifold 70 for transfer between two beds or alternatively for venting through valve 6.

Figure 2:
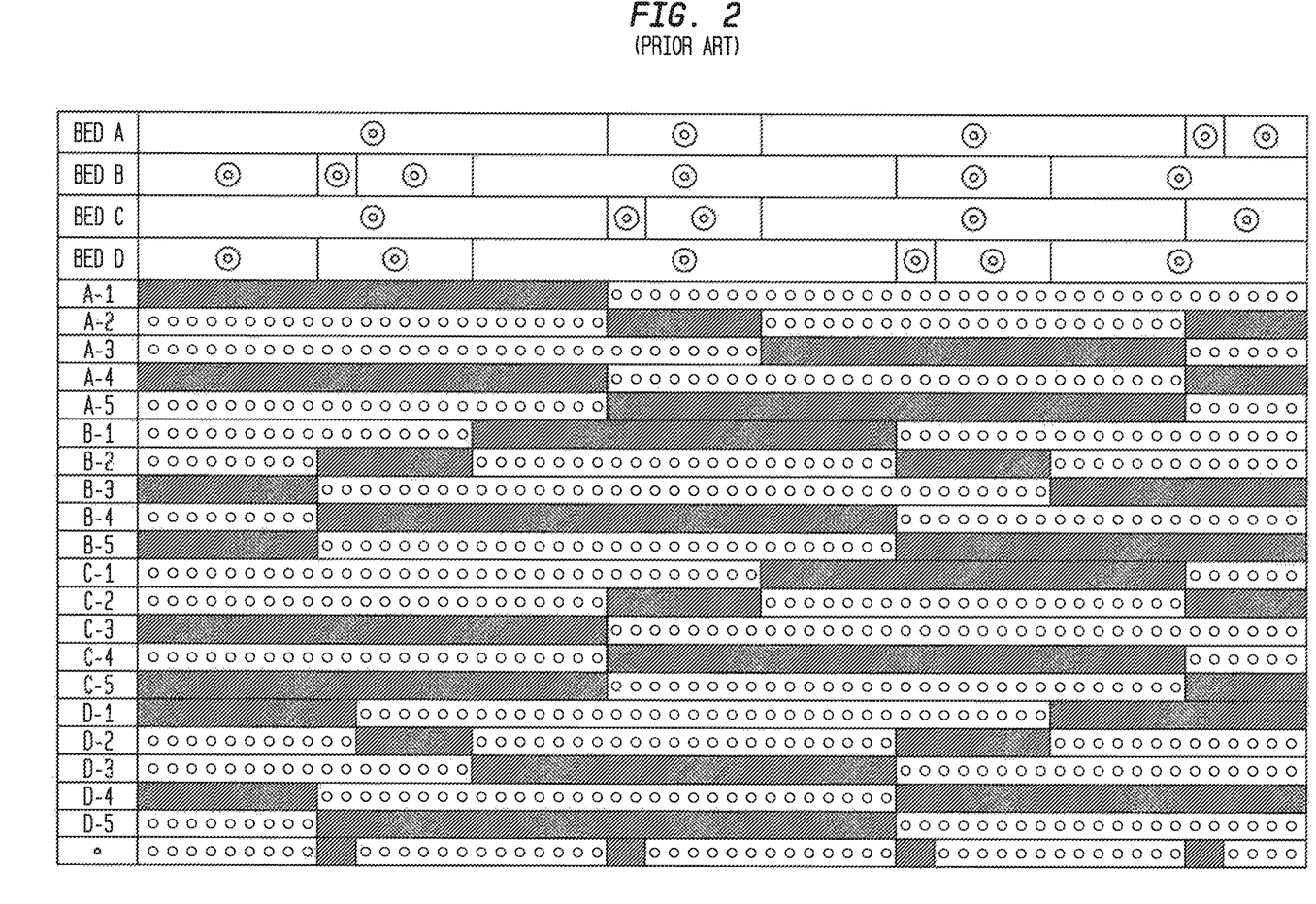
FIG. 2 is a prior art schematic describing the cycle steps for the four bed ozone production system shown in FIG. 1.

As shown in FIG. 2, the operation of the ozone generation process can be explained as a sequence of five steps using the four bed oxygen recovery process described in this patent application. In step 1 of the process, labelled S1, feed gas from the ozone generator enters bed X through valve X-4. Ozone in the feed gas is selectively adsorbed on the adsorbent in bed X and excess oxygen to be recovered passes through the bed X and through valve X-1 and then to the recycle circuit. The recovered oxygen is mixed with makeup oxygen and the mixed oxygen is compressed by a blower to overcome the pressure loss in the system before being sent to the ozone generator as described above.

When bed X is saturated with ozone in S1, and just before the ozone starts to break through from the adsorbent bed X, step 2 (S2) of the cycle is initiated. A stream of nitrogen rich purge gas from another bed is fed to the top of bed X through valve X2. This purge gas comes from a different bed which has just switched to receiving oxygen/ozone feed gas according to step 4 (S4) and step 5 (S5) as will be further explained below. The purge gas causes desorption of the ozone from bed X with the desorbed ozone passing through valve X5 and sent as product ozone to the customer.

At the conclusion of S2, an external purge gas stream is introduced into the top of bed X through valve X3 in step 3 (S3). This external purge gas can be either dry air or any other dry nitrogen rich gas having a dew point less than −80° F. This purge gas desorbs ozone remaining in the adsorbent bed X and then again passes through valve X5 as product.

When the ozone has been sufficiently desorbed from adsorbent bed X, S3 concludes and feed gas from the ozone generator is again introduced through valve X4, which starts step 4 (S4) of the cycle. In S4, the un-adsorbed gas exiting the top of the bed X initially has more nitrogen content than that from S1, because of the nitrogen rich purge gas used in the purge step S3. This higher nitrogen content gas is utilized as the purge gas for a different bed passing through valve X2 as explained for S2. A portion of this higher nitrogen gas may be vented from the process through the vent valve 6 in order to prevent buildup of unwanted contaminants like argon, hydrocarbons or water in the recycle oxygen gas.

The venting of the contaminants during S4 lasts for a short duration and is the only difference between S4 and step 5 (S5). Therefore, during S5, the vent valve 6 is closed and the purge gas from the adsorbent bed X continues to flow as purge gas to a different bed. As steps S4 and S5 proceed the residual nitrogen in bed X is displaced by adsorbed ozone as well as un-adsorbed oxygen, so that by the end of step 5, bed X has returned to a condition where the restart of the cycle at S1 is appropriate.

The duration of step 4 depends on the nature and amounts of impurities that can be tolerated in the feed to the ozone generator. In some circumstances this step may be omitted or utilized only intermittently, e.g. once every predetermined number of cycles. The duration of step 4 plus step 5, or step 5 alone if step 4 is omitted, depends on the level of nitrogen required in the feed to the ozone generator.

The system and operation described in U.S. patent application Ser. No. 15/377,021 provides for recycle of up to 70% of the oxygen to the ozone generator and therefore significantly reduces costs of operation. Another positive feature of this system and operation is that if the optional step 4 is not utilized, then there are no waste streams diverted or vented to the atmosphere. Rather, there is 100% utilization of the make-up oxygen, CDA or nitrogen purge and the ozone generated. However, the use of the exiting gas during step 4 and step 5 to purge a different bed can lead to higher oxygen levels in the ozone product. This can be undesirable for several reasons, including that if oxygen levels are too high in the ozone product, there is a risk of fire or explosion, from oxygen passing through solvents used in the reaction or collecting in the head space of the reactor. The system and operation described above may lead to ozone product oxygen levels in the range of 25% to 40%. This is generally an acceptable level of oxygen for safe operation and for most typical industrial or water industry ozone applications. However, this level of oxygen in the product ozone stream may be unacceptably high for many fine chemical reactions and production applications. Further, this operation requires that the purge gas flow or CDA or nitrogen must change rapidly from full flow when more than one bed is operating in step 3 to 40% to 60% when only one bed is operating in step 3 and one bed is operating in step 2. These transitions from high flow to low flow and low flow to high flow occur simultaneously four times during the operation cycle described above. This requires a sophisticated control scheme for the purge gas flow, making the operation relatively complicated.

There remains a need in the art for improvements to ozone production with the recapture and recycle of oxygen, particularly for use with fine chemical reaction and production.

SUMMARY OF THE INVENTION

The system and method of the invention overcomes the problems noted above. In particular, the invention provides for ozone production that recaptures and recycles a majority of the oxygen used by the ozone generation process and also provides for the production of an ozone product stream that is low in oxygen content and therefore suitable for use in fine chemical applications.

According to the invention a system and method for the continuous production of ozone and the recovery of oxygen in a purge cycle adsorption process is provided.

A method for the continuous production of ozone having an oxygen concentration less than that of air and recovery of oxygen in a purge cycle adsorption process having four adsorbent beds, in which a first, second, third and fourth beds each cycle sequentially through the following steps in an overlapping cycle:
a) Feeding an oxygen and ozone mixture from an ozone generator to a first bed, wherein ozone is adsorbed in the first bed and non-adsorbed oxygen passes through the first bed and is recycled back to the ozone generator;
b) Feeding a first nitrogen-rich purge gas in a counter current direction to step a) thereby desorbing an oxygen enriched ozone stream from the first bed to a customer process;
c) Feeding a second nitrogen-rich purge gas in the counter current direction to step a) thereby desorbing the oxygen-depleted ozone from the first bed to the customer process;
d) Feeding an oxygen and ozone mixture from the ozone generator to the first bed in the same direction as in step a) whereby ozone is adsorbed in the first bed and non-adsorbed oxygen rinse gas displaces a nitrogen-rich purge gas from the first bed through a vent, preparing the first bed to repeat step a);
e) Feeding an oxygen and ozone mixture from an ozone generator to a second bed, wherein ozone is adsorbed in the second bed and non-adsorbed oxygen passes through the second bed and is recycled back to the ozone generator;
f) Feeding a first nitrogen-rich purge gas in a counter current direction to step e) thereby desorbing an oxygen enriched ozone stream from the second bed to a customer process;
g) Feeding a second nitrogen-rich purge gas in the counter current direction to step e) thereby desorbing the oxygen-depleted ozone from the second bed to the customer process;
h) Feeding an oxygen and ozone mixture from the ozone generator to the second bed in the same direction as in step e) whereby ozone is adsorbed in the second bed and non-adsorbed oxygen rinse gas displaces a nitrogen-rich purge gas from the second bed and feeds the displaced nitrogen-rich purge gas through a vent, preparing the second bed to repeat step e);
wherein steps e) to h) are offset in time from steps a) to d) such that the beginning of steps a) and c) overlap with the end of steps e) and g) and the end of steps a) and c) overlap with the beginning of steps e) and g).

The method further comprises venting a portion of the nitrogen-rich purge gas to the atmosphere at the start of step b) and step f).

Make-up oxygen may be mixed with recycled oxygen before the recycled oxygen is fed to the ozone generator.

The mixture of recycled oxygen and make-up oxygen is fed through a blower to increase its pressure before being fed to the ozone generator. The mixture of recycled oxygen and make-up oxygen can be passed through an inline ozone destruct unit prior to being fed to the blower.

The vent streams from steps b) and f) may be passed through one or more ozone destruct units before being released into the atmosphere. Likewise, the vent streams from steps d) and h) may be passed through one or more ozone destruct units before being released to the atmosphere.

The oxygen and ozone gas mixture that is fed to the adsorbent beds comprises about 1 to 30% by weight ozone, preferably from about 6 to 12% by weight.

The oxygen concentration of the ozone stream sent to the customer is less than 15% by volume. Preferably this oxygen concentration is less than 10% by volume and more preferably less than 5% by volume.

Buffer tanks may be connected to a source selected from the group consisting of the recovered ozone, the recycled oxygen or both.

The first, second, third and fourth adsorbent beds can contain an adsorbent material which is selected from the group consisting of silica gel and high silica zeolites. The silica gel can be of different particle sizes. The high silica zeolites are selected from the group consisting of DAY, MFI and dealuminated mordentite.

The cycle may be a concentration swing adsorption cycle.

The duration of steps a) and c) and steps e and g) are equal and range from 5 to 600 seconds with a range of 30 to 500 seconds preferable and a range of 60 to 120 seconds more preferable.

The duration of steps b) and d) and steps f) and h) are equal and range from 5 to 50% of step a). More preferable they range from 25 to 40% of step a).

DETAILED DESCRIPTION OF THE INVENTION

The system and method of the invention provides for ozone production that recaptures and recycles a majority of the oxygen used by the ozone generation process and also provides for the production of an ozone product stream that is low in oxygen content and therefore suitable for use in fine chemical applications.

The invention can be generally described as the integration of two 2 bed adsorbent bed cycles that are offset in time to meet process requirements. Therefore, the four adsorbent beds can be described as at least two subsets of two adsorbent beds. In particular, the pressure and concentration requirements for recycled oxygen and for the ozone product stream for both the ozone generator and the customer process are met without the need for large buffer tanks.

The invention will be described in detail with reference to drawing FIGS. 3-9.

Figure 3:
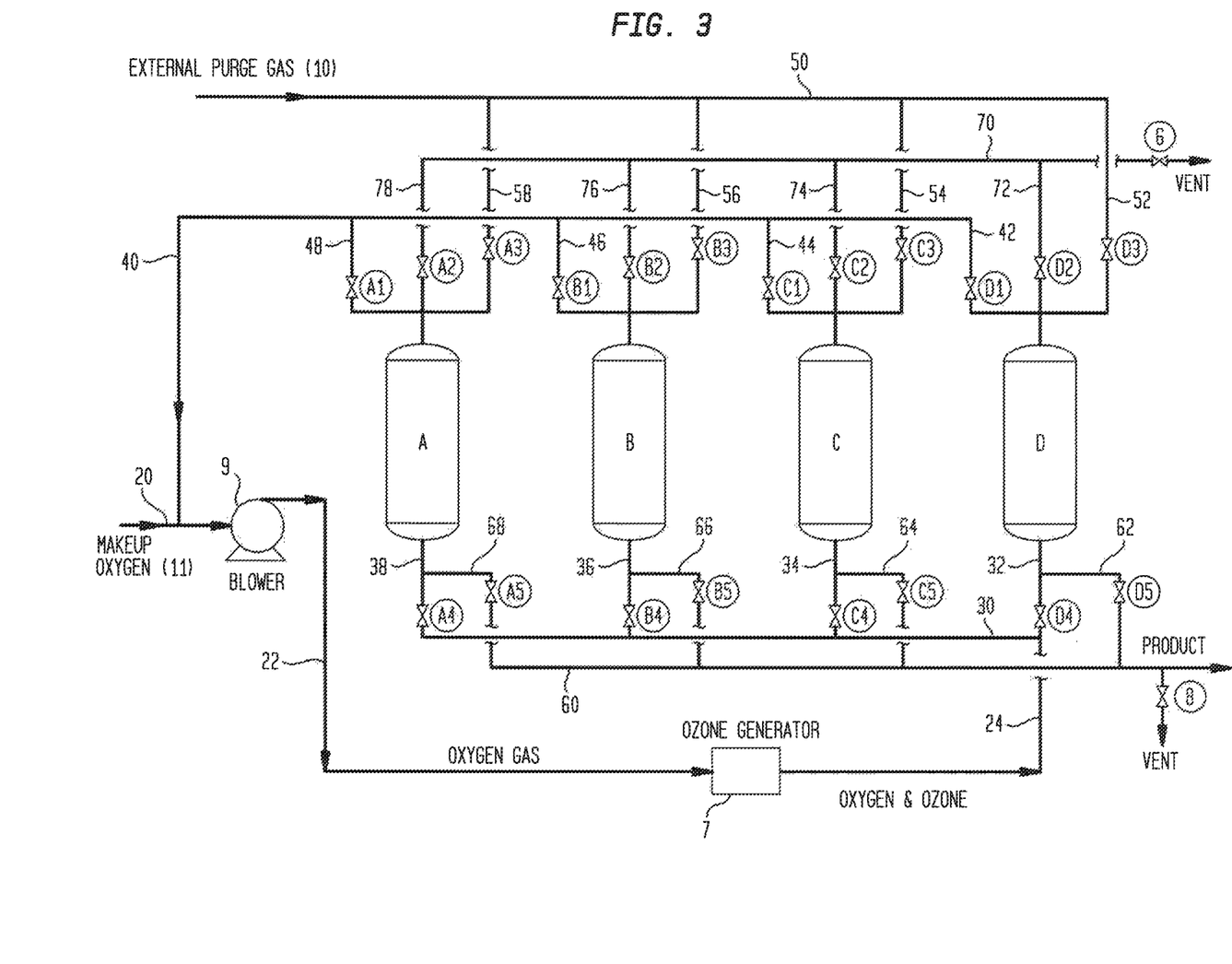
FIG. 3 is a schematic of a four bed process to produce ozone with recovery and recycle of oxygen used in the process according to the invention.

FIG. 3 is a schematic of a four bed process to produce ozone with recovery and recycle of oxygen used in the process according to the invention. The system is similar to the system described in prior art FIG. 1 and like reference numerals will be used to describe like components.

As shown in FIG. 3, make up oxygen is supplied through line 20 and is mixed with recycled oxygen from the adsorbent beds through line 40. The combined oxygen stream is fed through blower 9 to an ozone generator 7. Ozone is produced in the ozone generator at ozone concentrations of 1 to 30%, preferably 5 to 15%, more preferably 6 to 12% by volume (balance oxygen). The ozone and oxygen mixture is fed through line 24 to a manifold 30 for supply of the oxygen/ozone mixture to the bottom of the adsorbent beds. Ozone is adsorbed within the selected adsorbent bed or beds. Line 40 collects the oxygen that passes un-adsorbed out the tops of the selected beds and recycles this stream to be mixed with the make-up oxygen. Line 50 is a supply line for nitrogen rich purge gas to by supplied to the tops of the beds and that is used to desorb the ozone from such beds. Line 60 collects the ozone product from the bottom of the beds and delivers the ozone product to the customer process. A product stream valve 8 is provided to allow ozone product to be vented from line 60, particularly when the oxygen content of the ozone product is above a desired level. A manifold 70 allows gas exiting from the top of the beds to be vented through valve 6. For both vents, the gas to be vented is preferably passed through an inline ozone destruct unit prior to being vented. In addition, the combined stream of make-up oxygen and recycled oxygen is advantageously processed through an ozone destruct unit prior to entering the blower 9.

To explain the cyclical operation and valve sequences, an X may be used to represent an adsorbent bed, e.g. any of absorbent beds A, B, C or D shown in FIG. 3. Similarly, a valve number preceded by X is to be interpreted as representing that valve number for any one of the beds A, B, C or D. Each Bed X (X=A, B, C or D) has 2 valves controlling gas flows at the bottom (X4 and X5) and 3 valves at the top (X1, X2 and X3). For a given bed, X, only one valve at the top and one valve at the bottom is open at any one time. Valve X4 connects the bottom of bed X to the oxygen/ozone manifold 30, and valve X1 connects the top of bed X to the recycle oxygen line 40. Valve X3 connects the top of bed X to the nitrogen rich purge gas stream supply line 50 and valve X5 connects the bottom of bed X to the ozone product line 60 to be sent to the customer process or alternatively to be vented through valve 8. Valve X2 connects the top of bed X to the manifold 70 for venting through valve 6.

Figure 4:
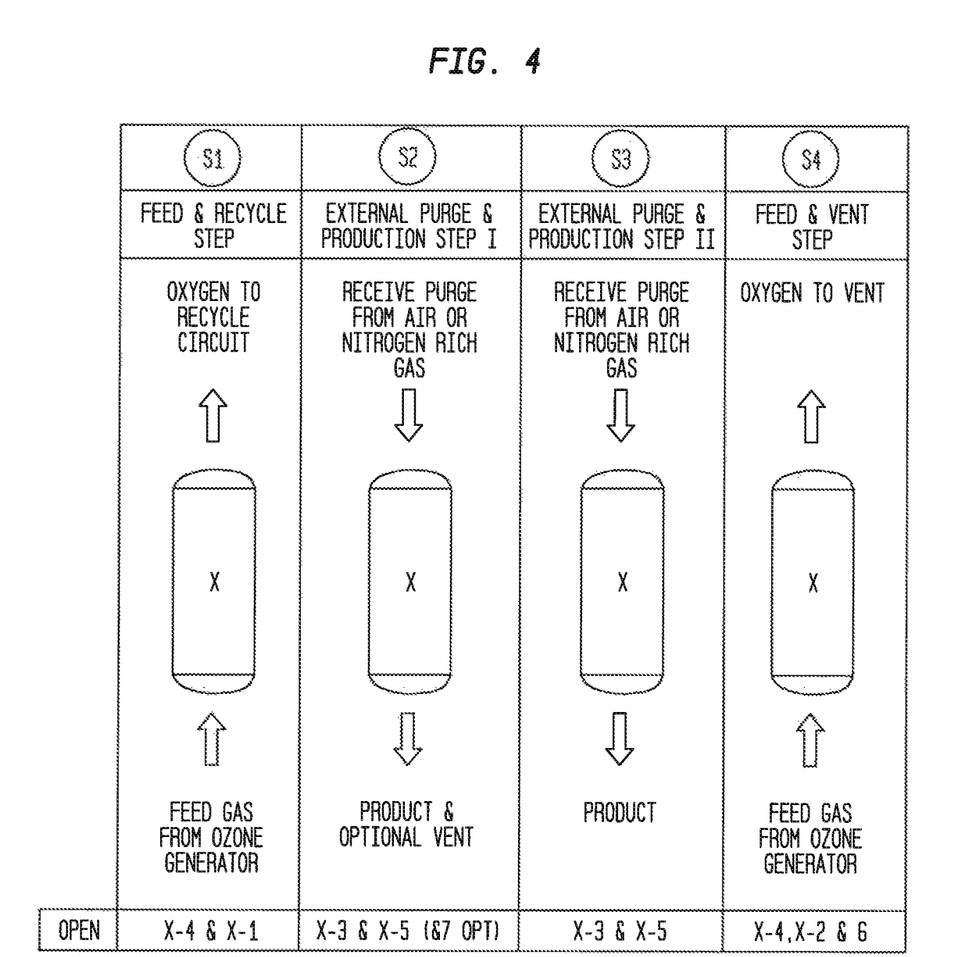
FIG. 4 is a schematic describing the cycle steps for the four bed ozone production system shown in FIG. 3.

As shown in FIG. 4, the operation of the ozone generation process can be explained as a sequence of four steps using the four bed oxygen recovery process according to the invention. In step 1 of the process, labelled S1, feed gas from the ozone generator enters bed X through valve X-4. Ozone in the feed gas is selectively adsorbed on the adsorbent in bed X and excess oxygen to be recovered passes through the bed X and through valve X-1 and then to the recycle circuit. The recovered oxygen is mixed with makeup oxygen and the mixed oxygen is compressed by a blower to overcome the pressure loss in the system before being sent to the ozone generator.

When bed X is saturated with ozone in S1, and just before the ozone starts to break through from the adsorbent bed X, step 2 (S2) of the cycle is initiated. A stream of a low oxygen content inert purge gas, such as essentially pure gaseous nitrogen or another dry nitrogen rich gas having a dew point less than less than −80° F. is introduced into the top of bed X through valve X3 in S2. This purge gas desorbs ozone from the adsorbent bed X with the desorbed ozone passing through valve X5 and sent as product ozone to the customer. The purge gas also acts to desorb any residual oxygen left in bed X from S1 and therefore the initial product stream may have a higher oxygen content than that desired particularly for ozone to be use in fine chemical applications. Therefore, this initial portion of the product stream can optionally be vented through valve 8, until the time when the oxygen content in the ozone product stream is sufficiently low enough for the desired application.

At the conclusion of S2, the flow of external purge gas continues through valve X3 and continues operation in step 3 (S3). The purge gas continues to desorb ozone from the adsorption bed X with the product ozone stream passing through valve X5 and provided to the customer process. During S3, the ozone product stream is free of residual oxygen and the optional venting is no longer required.

When the ozone has been sufficiently desorbed from adsorbent bed X, S3 concludes and feed gas from the ozone generator is again introduced through valve X4, which starts step 4 (S4) of the cycle. In S4, the un-adsorbed gas exiting the top of the bed X initially has more nitrogen content than that from S1, because of the nitrogen rich gas used in the purge steps S2 and S3. The higher nitrogen content gas exits the bed X through valve X2 to be vented through valve 6. This allows the bed X to be rinsed with oxygen prior to restarting the cycle and re-entering S1. In addition, this venting has the advantage of removing contaminants, such as argon, hydrocarbons or water, and avoids the buildup of such contaminants in the recycle oxygen gas.

The venting of product gas through valve 8 may result in some ozone loss. There should be very little ozone present in the stream exiting for venting during S4, as the bed X has been purged with nitrogen to create the ozone product stream. However, to avoid the escape of toxic ozone to the atmosphere, both vent streams should pass through an ozone destruct unit (either catalytic or thermal) prior to being vented.

Figure 5:
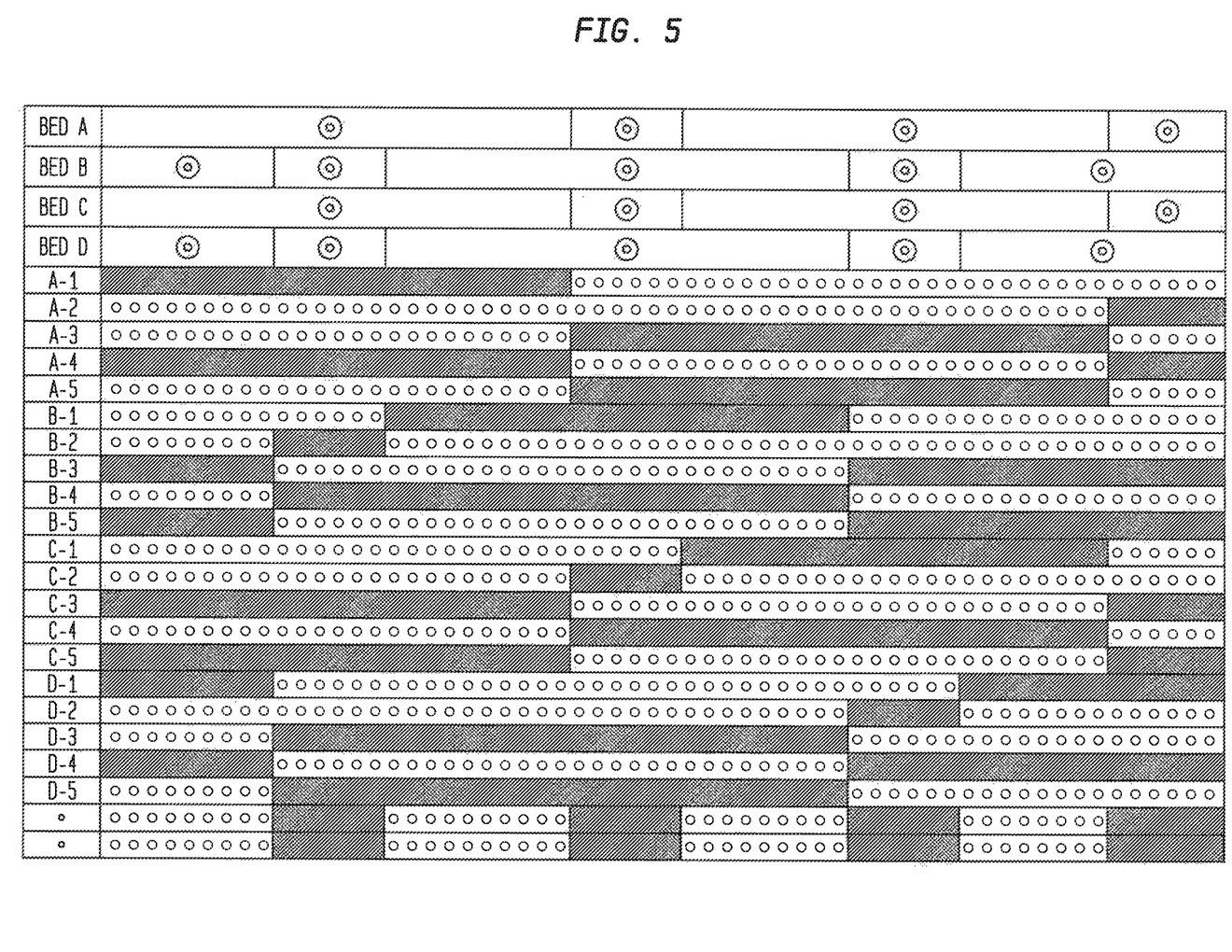
FIG. 5 is a valve table illustrating the valve positions of the valves shown in FIG. 3 for different cycle sequence steps as shown in FIG. 4.

FIG. 5 is a valve table illustrating the valve positions for the valves shown in FIG. 3 for different cycle sequence steps as shown in FIG. 4. As noted above, the invention can be generally described as the integration of two 2 bed adsorbent bed cycles that are offset in time to meet process requirements. This can be seen from the valve table of FIG. 5 which shows the status of each valve in the system as being either "o" (open) or "c" (closed) for each of the steps S1, S2, S3 and S4 discussed with reference to FIG. 4. The valves are those identified in FIG. 3 (X-1, X-2, X-3, X-4 and X-5 where X can any given bed A, B, C or D, and also valve 6 and valve 8).

The beds A and, C and B and D make up the two subsets of beds. When bed A is operating in S1 of the cycle, bed C is operating in S3 of the cycle and visa-versa. When bed A is operating in S2 of the cycle, bed C is operating in S4 of the cycle and visa-versa. In a similar manner, when bed B is operating in S1 of the cycle, bed D is operating in S3 of the cycle and visa-versa and when bed B is operating in S2 of the cycle, bed D is operating in S4 of the cycle and visa-versa. The external rinse and vents steps S2 and S4 of the cycle for beds A and C occur in the middle of the oxygen recycle and ozone production steps S1/S3 for beds B and D and visa-versa. Further, for both steps S1 and S3, the offset cycles for the subsets of beds NC and B/D are such that the following occurs:

the last portion of bed A operating in S1 overlaps with the first portion of bed B operating in S1;

the last portion of bed B operating in S1 overlaps with the first portion of bed C operating in S1;

the last portion of bed C operating in S1 overlaps with the first portion of bed D operating in S1; and the last portion of bed D operating in S1 overlaps with the first portion of bed A operating in S1.

In a similar manner the offset cycles for the beds operating in S3 are set so that the following occurs:

the last portion of bed A operating in S3 overlaps with the first portion of bed B operating in S3;

the last portion of bed B operating in S3 overlaps with the first portion of bed C operating in S3;

the last portion of bed C operating in S3 overlaps with the first portion of bed D operating in S3; and the last portion of bed D operating in S3 overlaps with the first portion of bed A operating in S3.

The step time for S1 is equal in time to the step time for S3 and continues for a range of 5 to 600 seconds, preferably a range of 30 to 500 seconds, and more preferably a range of 60 to 120 seconds. The step time for S2 is equal in time to the step time for S4 and continues for a range of 5% to 50% of the step time for S1, preferably a range of 25% to 40% of the step time for S1.

FIGS. 6 through 9 are individual schematics illustrating each of the steps S1 through S4 providing greater detail thereof. FIGS. 6-9 describe these steps with reference to adsorbent bed D.

Figure 6:
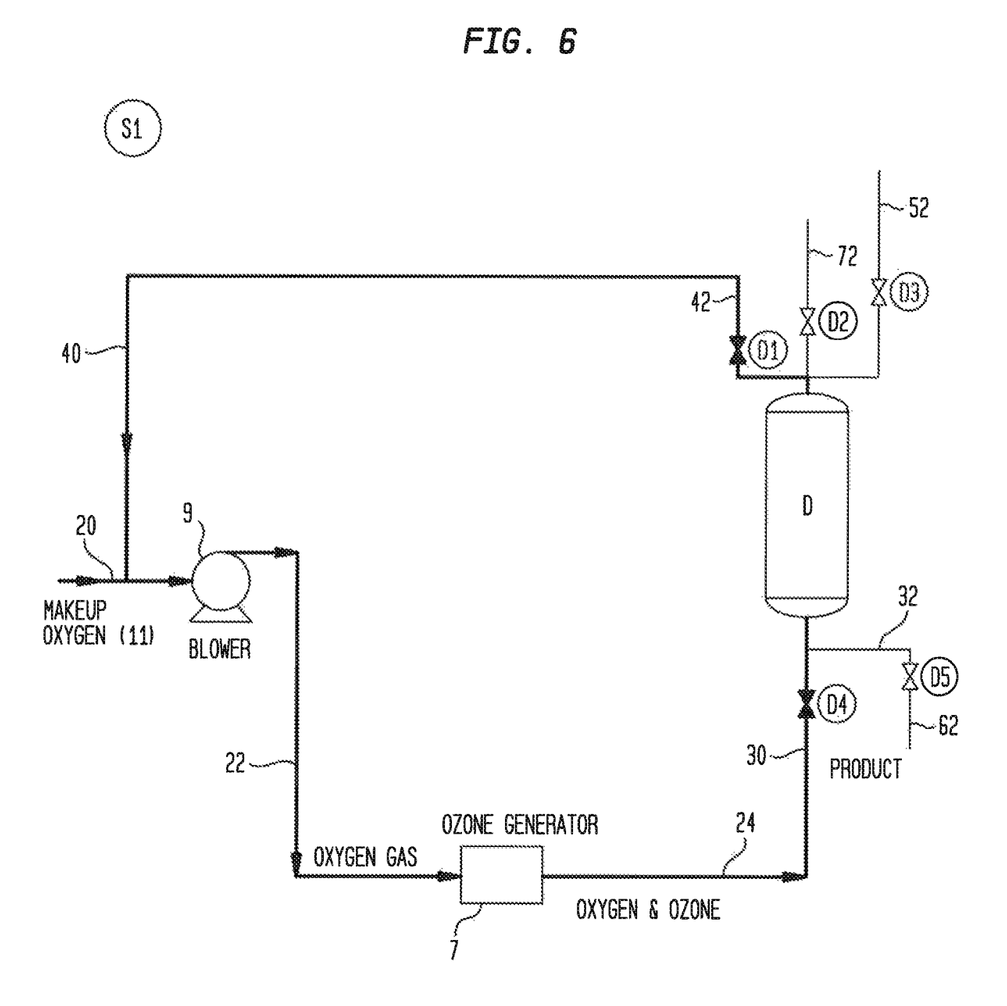
FIG. 6 is a schematic illustrating step 1 of FIG. 4 for the bed D from FIG. 3.

FIG. 6 is a schematic illustrating step 1 of FIG. 4 for the bed D from FIG. 3. In FIG. 6, adsorbent bed D is operating in the feed and recycle step S1. Makeup oxygen is fed through line 20 to blower 9 which delivers pressurized oxygen through line 22 to ozone generator 7. The resulting mixture of ozone and oxygen is fed through line 24 and open valve D4 via line 30 to adsorbent bed D. Ozone is adsorbed in bed D and oxygen exits bed D through open valve D1 and line 40 back to line 20 to join with the makeup oxygen feed.

Figure 7:
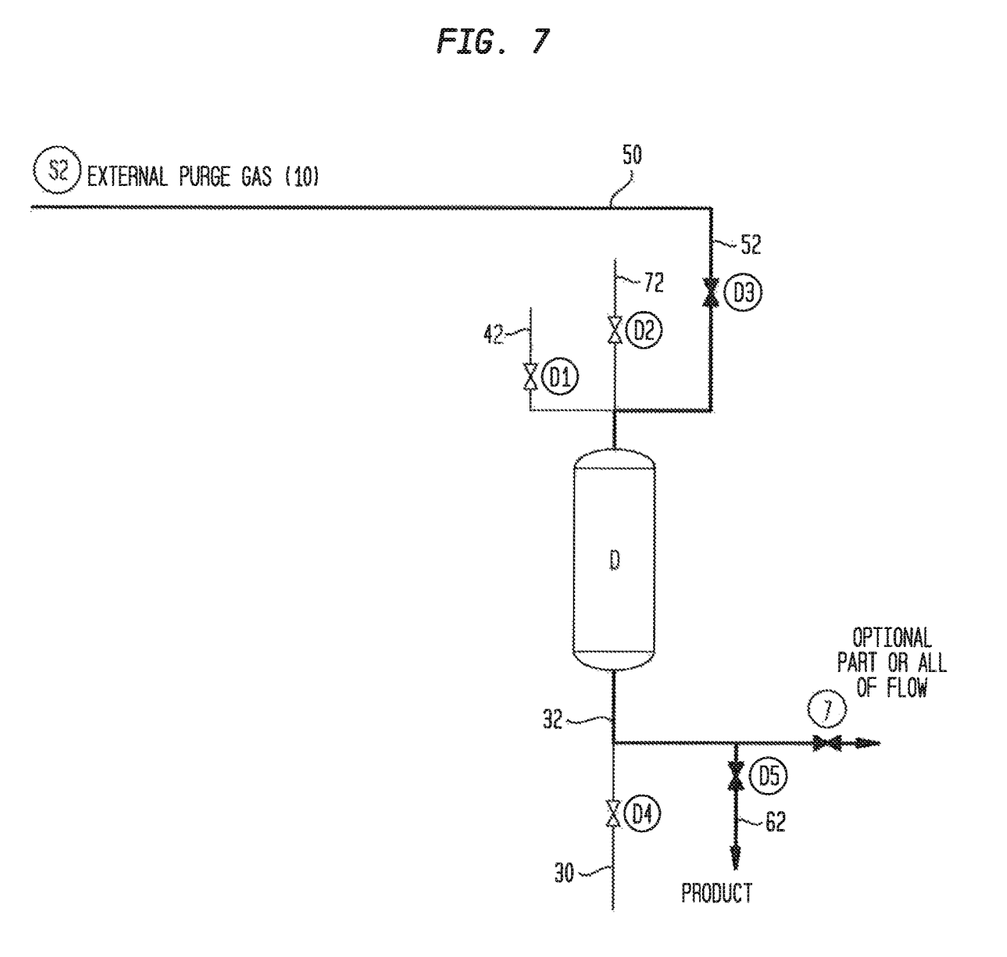
FIG. 7 is a schematic illustrating step 2 of FIG. 4 for the bed D from FIG. 3.

FIG. 7 is a schematic illustrating step 2 of FIG. 4 for the bed D from FIG. 3. In FIG. 7, adsorbent bed D is operating in the bed purge and production step, S2. Purge gas is delivered through line 50, line 52 and open valve D3 into adsorbent bed D. The purge gas sweeps residual oxygen from S1 and desorbs a portion of the ozone from bed D. The product ozone stream exits bed D through line 32 and open valve D5 to line 62 where it can then be collected in line 60 for delivery to the customer process. Optionally, a portion or all of the product stream may be vented through valve 8 until a lower oxygen concentration in the ozone product stream is reached.

Figure 8:
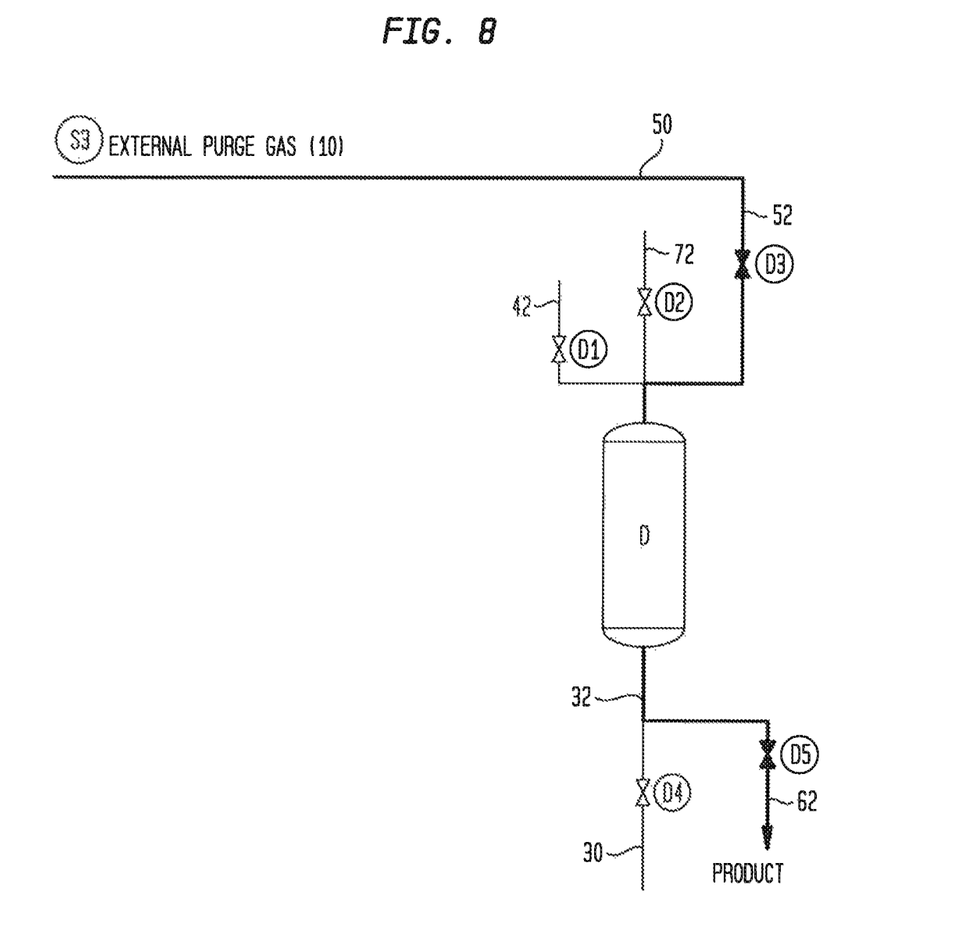
FIG. 8 is a schematic illustrating step 3 of FIG. 4 for the bed D from FIG. 3.

FIG. 8 is a schematic illustrating step 3 of FIG. 4 for the bed D from FIG. 3. In FIG. 8, adsorbent bed D is operating in the further bed purge and production step, S3. Purge gas continues to be delivered through line 50, line 52 and open valve D3 into adsorbent bed D. By this time in the cycle, residual oxygen has all been swept out of bed D. The purge continues to desorb ozone from bed D as the product ozone stream. This product stream exits bed D through line 32 and open valve D5 to line 62 for collection in line 60 and delivery to the customer process. Further venting through valve 8 is not necessary as the ozone product stream is now free of the residual oxygen.

Figure 9:
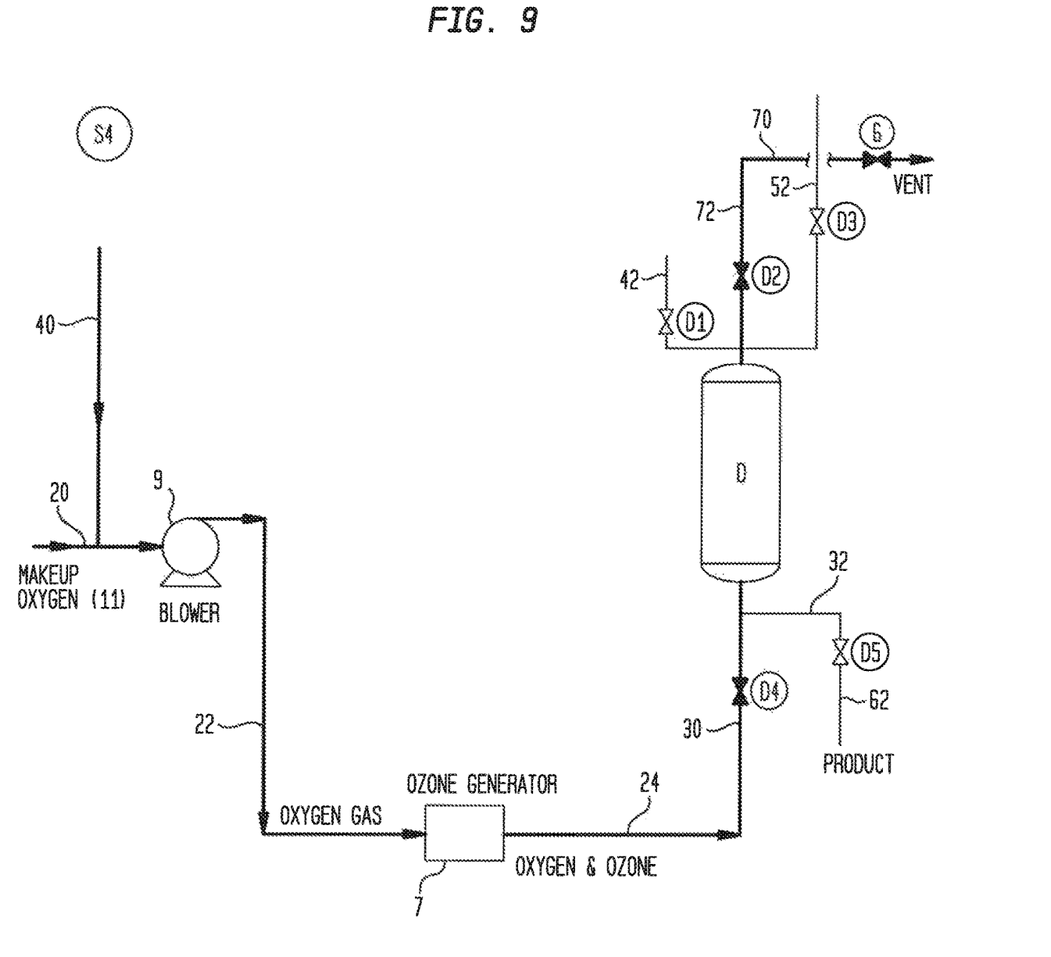
FIG. 9 is a schematic illustrating step 4 of FIG. 4 for the bed D from FIG. 3.

FIG. 9 is a schematic illustrating step 4 of FIG. 4 for the bed D from FIG. 3. In FIG. 9, adsorbent bed D is operating in the bed clean and vent step S4. Make-up oxygen is fed through line 20 to blower 9 which delivers pressurized oxygen through line 22 to ozone generator 7. The resulting mixture of ozone and oxygen is fed through line 24 and open valve D4 to adsorbent bed D via line 30. As ozone is adsorbed from the mixture in bed D, oxygen exits bed D through line 72 and open valve D2. This oxygen acts to remove purge gas from S2 and S3 from the bed D and is therefore higher in concentration of nitrogen than is desired for recycle to the ozone production process. Therefore, the oxygen stream exiting bed D is fed through line 72 to line 70 for venting through valve 6. Because bed D has been purged in S2 and S3, any residual ozone remaining in bed D will have been pushed to the bottom of bed D and therefore little ozone would be lost during this venting step. In other words, bed D is rinsed with oxygen in order to return bed D to a state in which the cycle starting with S1 can begin again. This step (S4) is timed to be just sufficient to reduce the residual nitrogen content in the stream exiting bed D to a level that allows for the recycle of the oxygen stream to the ozone production step.

The four bed cycle according to the invention allows for the continuous production of ozone and recycle of oxygen, particularly when the optional vent through valve 8 is omitted. Operation of the cycle in concentration swing mode, i.e. with the minimum of pressure or temperature swings between the adsorption and desorption steps, ensures that the pressures of the two product streams remain roughly constant. This mode of operation, together with the overlapping cycle steps, allows the system to run without the need for large buffer tanks. Small buffer tanks may be added to one or both of the recycle oxygen and ozone product lines, in order to meet stringent needs imposed by the ozone generator manufacturer or the ozone customer; For example, an ozone buffer tank can be employed along the ozone product stream line to the customer process in order to reduce fluctuations in ozone purity. A buffer tank may also be used to temporarily store recovered/recycled oxygen.

Each of the four adsorbent beds (A, B, C, D) contain an adsorbent material. The adsorbent material should have low metal contamination in order to prevent dissociation of ozone molecules back to oxygen molecules. Absorbent materials useful for this process may be selected from silica gel and high silica zeolites. The silica gel can be of different particle sizes, with larger beads located in layers near the inlet and outlet ends of the adsorption beds. High silica zeolites may be selected from DAY, MFI and dealuminated mordentite.

In particular, the beds may include three layers of different sizes of absorbent material, such as silica gel. A first layer at the bottom of the bed may contain larger particle sizes of 3 to 5 millimeter in size. This layer is designed in part to allow higher initial flow of gas into the process without danger of fluidization of the bed. This first layer comprises between 5 to 15% of the total weight of silica gel adsorbent to be used in the bed. A second layer or middle layer has a smaller particle size and thereby high adsorption capacity and faster diffusion kinetics to allow faster cycle steps. This smaller particle size may be from 0.5 to 1.5 millimeter. These particles allow better gas distribution due to a higher pressure drop. A third layer or top layer again has a larger particle size, again 3 to 5 millimeter in size and also makes up about 5 to 15% of the total weight of adsorbent used in the bed. The larger particle size provides lower susceptibility to fluidization of the top layer.

The invention has been described above showing a system employing four adsorption beds. However, the system and process of the invention can be extended to include eight or twelve beds using similar sequenced cycle steps as were explained for the four bed system above. The invention was also described with the feed from the ozone generator entering the bottom of beds and the purge gas entering the top of the beds. Alternatively, the ozone feed to the bed can be from the top of the bed and the purge can be fed to the bottom of the bed.

The beds may be equipped with an internal source of heating or cooling in order to optimize and maximize the functionality of the adsorbent material. The beds are designed to operate at about 0.5 to 2.5 pounds per square inch (psi) pressure drop during operation. The regeneration of the adsorbent beds using purge gas at an elevated temperature not greater than 100° C. improves regeneration and can delivers ozone in higher concentrations and can potentially allow for a reduction in the size of the adsorbent bed. The adsorption of the ozone and oxygen mixture can occur at temperatures down to 0° C. also allowing a reduction in the size of the adsorbent beds. The feed to the ozone generator and/or the first adsorbent bed may be compressed to pressures up to 50 psig (3.44 bar) to increase the adsorption capacity of the adsorbent and again allow for reducing the size of the adsorbent beds.

As explained above, one advantage of the invention is that the ozone product stream is lower in oxygen content than could be achieved using prior systems. This is because a portion of the oxygen rich gas that exits the adsorption beds is vented rather than used as part of the purge gas stream. In addition, by adding the valve for venting a portion of the ozone product stream (which may initially have a higher oxygen content), provides for lower oxygen concentration in the ozone product to be provided to the customer application.

It is noted that a single bed volume of oxygen that remains in the bed from step 1, is still displaced to the ozone product stream at the start of step 2. It is this portion that may be vented through valve 8. However, such venting will result in the loss of some ozone product. For example, when one of the beds B or D are operating in step 2, one of the beds A or C are operating in step 3 and both exit streams from step 2 and step 3 will be mixed in the product line 60. This means that the higher oxygen content product stream from step 2 will be diluted with the essentially oxygen free product stream from step 3, resulting in a lower oxygen content mixed product stream than was previously achieved. This is true even in the optional venting through valve 8 is not used.

Even without the venting of product from step 2 through valve 8, oxygen concentrations in the product stream of less than 21%, and typically less than 15% and as low as less than 10% may be achieved. If the venting of product from step 2 is utilized, then, oxygen concentrations in the product stream of less than 10%, and as low as less than 5% may be achieved.

By adding the single valve 8 to the system, the lower oxygen concentrations of the product stream can be achieved as noted above. But as noted, venting a portion of the product stream will result in the loss of some ozone because of the mixing of product from step 2 and step 3. As an alternative, four separate vent valves can be provided, one associated with each of the four beds. This would allow for separate venting of part or all of the product stream from step 2 from one bed without venting any of the product stream from step 3 of a different bed. In another alternative, a further manifold could be provided at the product outlet side of the beds (the bottom as described above), the manifold having a further valve for each bed (i.e. X6) and the manifold also connected to vent valve 8. Further, manifold 70 and valve 6 can be replaced by connecting valves X2 directly to the vent.

The process of the system can be controlled by timing of the cycle steps or by purity control with automatic adjustment to optimize performance. Timing control can be based on historical data which can be adjusted for optimization as further data is collected, particularly to optimize oxygen recovery and product stream purity. For purity control, the stream purities can be measured and the process stepped through the sequence to prevent significant breakthrough of nitrogen or ozone into the recycled oxygen.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what we claim is:

1. A method for the continuous production of ozone having an oxygen concentration less than that of air and recovery of oxygen in a purge cycle adsorption process having four adsorbent beds, in which a first, second, third and fourth beds cycle sequentially through the following steps in an overlapping cycle:
  a) Feeding an oxygen and ozone mixture from an ozone generator to a first bed, wherein ozone is adsorbed in the first bed and non-adsorbed oxygen passes through the first bed and is recycled back to the ozone generator;
  b) Feeding a first nitrogen-rich purge gas in a counter current direction to step a) thereby desorbing an oxygen enriched ozone stream from the first bed to a customer process;
  c) Feeding a second nitrogen-rich purge gas in the counter current direction to step a) thereby desorbing the oxygen-depleted ozone from the first bed to the customer process;
  d) Feeding an oxygen and ozone mixture from the ozone generator to the first bed in the same direction as in step a) whereby ozone is adsorbed in the first bed and non-adsorbed oxygen rinse gas displaces a nitrogen-rich purge gas from the first bed through a vent, preparing the first bed to repeat step a);
  e) Feeding an oxygen and ozone mixture from an ozone generator to a second bed, wherein ozone is adsorbed in the second bed and non-adsorbed oxygen passes through the second bed and is recycled back to the ozone generator;
  f) Feeding a first nitrogen-rich purge gas in a counter current direction to step e) thereby desorbing an oxygen enriched ozone stream from the second bed to a customer process;
  g) Feeding a second nitrogen-rich purge gas in the counter current direction to step e) thereby desorbing the oxygen-depleted ozone from the second bed to the customer process;
  h) Feeding an oxygen and ozone mixture from the ozone generator to the second bed in the same direction as in step e) whereby ozone is adsorbed in the second bed and non-adsorbed oxygen rinse gas displaces a nitrogen-rich purge gas from the second bed and feeds the displaced nitrogen-rich purge gas through a vent, preparing the second bed to repeat step e);
  wherein steps e) to h) are offset in time from steps a) to d) such that the beginning of steps a) and c) overlap with the end of steps e) and g) and the end of steps a) and c) overlap with the beginning of steps e) and g).

2. The method as claimed in claim 1 further comprising venting a portion of the nitrogen-rich purge gas to the atmosphere at the start of step b) and step f).

3. The method as claimed in claim 1 in which make-up oxygen is mixed with recycled oxygen before it is fed to the ozone generator.

4. The method as claimed in claim 3 in which the mixture of recycled oxygen and make-up oxygen is fed through a blower to increase its pressure before being fed to the ozone generator.

5. The method as claimed in claim 3 in which the mixture of recycled oxygen and make-up oxygen is passed through an inline ozone destruct unit prior to being fed to the blower.

6. The method as claimed in claim 2 in which vent streams from steps b) and f) are passed through one or more ozone destruct units before being released to the atmosphere.

7. The method as claimed in claim 3 in which the vent streams from steps d) and h) are passed through one or more ozone destruct units before being released to the atmosphere.

8. The method as claimed in claim 1 wherein the oxygen and ozone gas mixture that is fed to the adsorbent beds comprises about 1 to 30% by weight ozone.

9. The method as claimed in claim 6 wherein the oxygen and ozone gas mixture that is fed to the adsorbent beds comprises about 6 to 12% by weight ozone.

10. The method as claimed in claim 1 wherein the oxygen concentration of the ozone stream sent to the customer is less than 15% by volume.

11. The method as claimed in claim 1 wherein the oxygen concentration of the ozone stream sent to the customer is less than 10% by volume.

12. The method as claimed in claim 1 wherein the oxygen concentration of the ozone stream sent to the customer is less than 5% by volume.

13. The method as claimed in claim 1 wherein buffer tanks are connected to a source selected from the group consisting of the recovered ozone, the recycled oxygen and both.

14. The method as claimed in claim 1 wherein the first, second, third and fourth adsorbent beds contain an adsorbent material.

15. The method as claimed in claim 10 wherein the adsorbent material is selected from the group consisting of silica gel and high silica zeolites.

16. The method as claimed in claim 11 wherein the silica gel is of different particle sizes.

17. The method as claimed in claim 11 wherein the high silica zeolites are selected from the group consisting of DAY, MFI and dealuminated mordentite.

18. The method as claimed in claim 1 wherein the cycle is a concentration swing adsorption cycle.

19. The method as claimed in claim 1 wherein the duration of steps a) and c) and steps e) and g) are equal and in the range 5 to 600 seconds.

20. The method as claimed in claim 1 wherein the duration of steps a) and c) and steps e) and g) are equal and in the range of 30 to 500 seconds.

21. The method as claimed in claim 1 wherein the duration of steps a) and c) and steps e) and g) are equal and in the range of 60 to 120 seconds.

22. The method as claimed in claim 1 wherein the duration of steps b) and d) and steps f) and h) are equal and in the range of 5 to 50% of step a).

23. The method as claimed in claim 1 wherein the duration of steps b) and d) and steps f) and h) are equal and in the range of 25 to 40% of step a).

* * * * *